(12) United States Patent
Hong et al.

(10) Patent No.: US 11,915,338 B2
(45) Date of Patent: Feb. 27, 2024

(54) LOADING APPARATUS AND METHOD FOR CONVOLUTION WITH STRIDE OR DILATION OF 2

(71) Applicant: HUAWEI TECHNOLOGIES CO., LTD., Guangdong (CN)

(72) Inventors: Zhou Hong, Santa Clara, CA (US); Yufei Zhang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 469 days.

(21) Appl. No.: 17/319,301

(22) Filed: May 13, 2021

(65) Prior Publication Data
US 2021/0264560 A1    Aug. 26, 2021

Related U.S. Application Data

(63) Continuation of application No. PCT/CN2019/093099, filed on Jun. 26, 2019.

(60) Provisional application No. 62/773,141, filed on Nov. 29, 2018.

(51) Int. Cl.
*G06T 1/20*  (2006.01)
*G06F 9/46*  (2006.01)
*G06T 1/60*  (2006.01)
*G06T 15/00* (2011.01)

(52) U.S. Cl.
CPC ............. *G06T 1/20* (2013.01); *G06F 9/462* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 2016/0269746 A1* | 9/2016 | Liu | H04N 19/583 |
| 2016/0292812 A1* | 10/2016 | Wu | G06T 1/20 |
| 2018/0005352 A1* | 1/2018 | Silverstein | H04N 23/11 |
| 2018/0210732 A1* | 7/2018 | Zhu | G06F 15/78 |

* cited by examiner

*Primary Examiner* — Joni Hsu
(74) *Attorney, Agent, or Firm* — Fish & Richardson P.C.

(57) ABSTRACT

The disclosed technology generally relates to a graphics processing unit (GPU). In one aspect, a GPU includes a general purpose register (GPR) having registers, an arithmetic logic unit (ALU) configured to read pixels of an image independently of a shared memory, and a level 1 (L1) cache storing the pixels read by the ALU. The ALU can implement pixel mapping by fetching a quad of pixels, which includes pixels of first, second, third, and fourth pixel types, from the L1 cache, grouping the pixels of the different pixel types of the quad into four groups based on pixel type, and, for each group, separating the pixels included in the group into three regions that each have a set of pixels. The pixels for each group can then be loaded into the registers corresponding to the three regions.

20 Claims, 10 Drawing Sheets

LOADING APPARATUS AND METHOD FOR CONVOLUTION WITH STRIDE OR DILATION OF 2

CROSS REFERENCE TO RELATED APPLICATIONS

This application is a continuation of International Application No. PCT/CN2019/093099, filed on Jun. 26, 2019, the disclosure of which is incorporated herein by reference as if reproduced in its entirety. This application also claims priority to U.S. provisional patent application Ser. No. 62/773,141, filed on Nov. 29, 2018 and entitled "Loading Apparatus And Method For Convolution With Stride Or Dilation Of 2", which is incorporated herein by reference as if reproduced in its entirety.

TECHNICAL FIELD

The present disclosure relates to computing systems and, more specifically, to graphics processing units.

BACKGROUND

Graphics processors are widely used to render two-dimensional (2D) and three-dimensional (3D) images for various applications such as video games, graphics, computer-aided design (CAD), simulation and visualization tools, imaging, etc. A graphics processor may perform various graphics operations to render an image. One such graphics operation is convolution filtering, which is commonly used in image processing, 3D post processing, 2D imaging operations, etc. Convolution filtering may be used to obtain effects such as edge sharpening, blurring, noise reduction, etc. Convolution filtering may also be used for scaling, rotation, texture mapping, etc.

SUMMARY

According to one aspect of the present disclosure, there is a graphics processing unit (GPU), comprising a general purpose register (GPR) comprising registers; an arithmetic logic unit (ALU) configured to read pixels of an image independently of a shared memory; and a level 1 (L1) cache, coupled to the GPR, storing the pixels read by the ALU, wherein the ALU configured to implement a pixel mapping by: fetching a quad of pixels from the L1 cache, wherein the quad includes first, second, third and fourth pixel types based on a position in the quad; grouping the first, second, third and fourth pixel types respectively into four groups, a first group comprises a first set of pixels of a first pixel type, a second group comprises a second set of pixels of a second pixel type, a third group comprises a third set of pixels of a third pixel type and a fourth group comprises a fourth set of pixels of a fourth pixel type; and for each of the first, second, third and fourth groups, respectively separating the first set of pixels, the second set of pixels, the third set of pixels and the fourth set of pixels into three regions, the three regions for each group comprising a first region having a fifth set of pixels, a second region having a sixth set of pixels and a third region having a seventh set of pixels.

Optionally, in any of the preceding aspects, the ALU is further configured to implement the pixel mapping for each of the four groups by loading the fifth set of pixels into one or more first registers in the first region in a horizontal manner, the sixth set of pixels into one or more second registers in the second region in a horizontal manner, and the seventh set of pixels into one or more third registers in the third region in a vertical manner, wherein each of the registers in the one or more first, second and third registers in each of the first, second, third and fourth groups are separately loaded as a contiguous ordered number of registers in the GPR.

Optionally, in any of the preceding aspects, the ALU is configured to perform a convolution operation for each of the four groups based on a respective pixel mapping; and add results of the convolution operation for each of the four groups.

Optionally, in any of the preceding aspects, the ALU is configured to perform a convolution operation for each of the four groups based on a respective pixel mapping; and reassemble the results of the convolution operation for each of the groups.

Optionally, in any of the preceding aspects, the convolution operation implements a convolution filter of a same size for the first, second, third and fourth groups.

Optionally, in any of the preceding aspects, the one or more third registers for each of the first, second, third and fourth groups in the GPR are loaded as the contiguous ordered number of registers in reverse order.

Optionally, in any of the preceding aspects, in each of the four groups the first regions has a fixed amount of pixels loaded in the one or more first registers, and the second and third regions have a variable amount of pixels respectively loaded in the one or more second and third registers based on a convolution filter size.

Optionally, in any of the preceding aspects, in each of the four groups, the first region is a body, the second regions is bottom padding and the third region is right padding.

Optionally, in any of the preceding aspects, the pixels stored in the GPR are convolution filter independent.

Optionally, in any of the preceding aspects, a granularity of the pixels is a half warp with eight bytes per pixel mapped into the one or more first, second and third registers of the GPR in each of the four groups.

Optionally, in any of the preceding aspects, in each of the four groups, the pixel mapping is independent of a convolution filter size and fixed relative to a location of an anchor register in the one or more first registers of the first region.

According to one aspect of the present disclosure, there is a computer-implemented method in a graphics processing unit (GPU) mapping pixels into registers of a general purpose register (GPR), the method comprising storing the pixels in a level 1 (L1) cache; reading the pixels, by an arithmetic logic unit (ALU) independently of a shared memory; and mapping pixels read from the L1 cache into the registers of the GPR, comprising: fetching a quad of pixels from the L1 cache, wherein the quad includes first, second, third and fourth pixel types based on a position in the quad; grouping the first, second, third and fourth pixel types respectively into four groups, a first group comprises a first set of pixels of a first pixel type, a second group comprises a second set of pixels of a second pixel type, a third group comprises a third set of pixels of a third pixel type and a fourth group comprises a fourth set of pixels of a fourth pixel type; and for each of the first, second, third and fourth groups, respectively separating the first set of pixels, the second set of pixels, the third set of pixels and the fourth set of pixels into three regions, the three regions for each group comprising a first region having a fifth set of pixels, a second region having a sixth set of pixels and a third region having a seventh set of pixels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
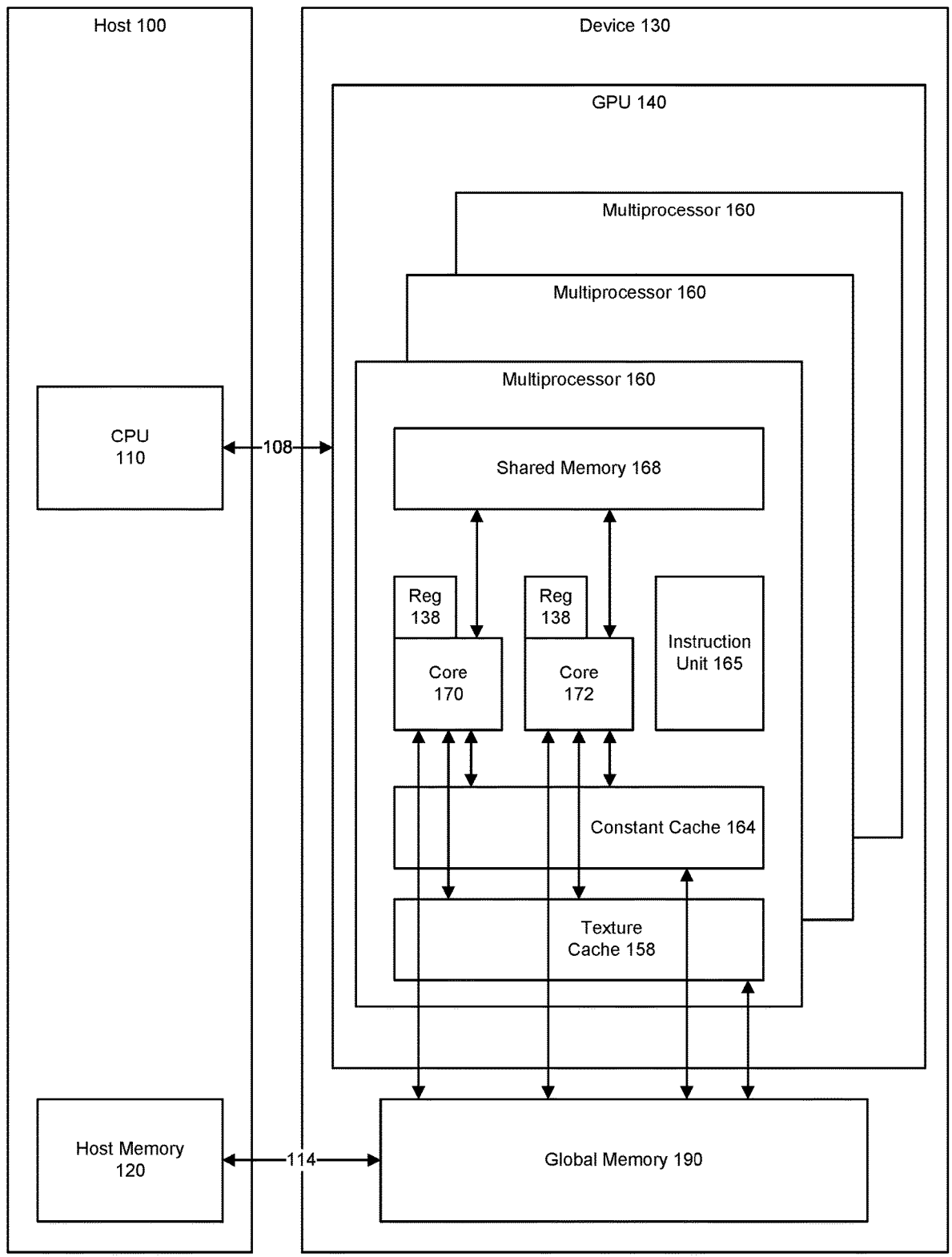
FIG. 1 illustrates a central processing unit in communication with a graphics processing unit of a device.

The present disclosure will now be described with reference to the figures, which in general relates to graphic processing units (GPUs), and in particular, to mapping pixel data into registers of a general purpose register (GPR).

Image Signal Processors (ISPs), for example in mobile devices, are responsible for handling increasingly larger images while maintaining or even reducing the power consumption by the processing devices. One of the most common operations performed by ISPs is the convolution operation that involves applying a filter to an input image to obtain an output image of an equal or smaller size. Convolution filters may be used for many different applications, ranging from image restoration and enhancement to feature detection.

Convolution operations using filters with increased stride or dilation (increased from a stride or dilation of 1) often result in an increased number of operations and/or use shared memory, which results in increased use of resources and power consumption. To reduce the number of operations, and thus reduce the use of resources and power consumption, the disclosed technology uses a level 1 (L1) cache to reorganize convolution pixel data of stride 2 or dilation of 2 into multiple, smaller regions in a general purpose register (GPR). Each of the smaller regions is a convolution pixel data with a filter of stride of 1 and dilation of 1. By reorganizing the convolution pixel data in this manner, a sliding window based convolution scheme may be used to perform a convolution operation on each of the smaller regions. The results of the convolution operation on each of the regions may then be combined or reassembled to form results for the original convolution operation of the pixel data or stride 2 or dilation 2.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Graphics processing typically involves coordination of two processors, a central processing unit (CPU) and a graphics processing unit (GPU). The GPU is a specialized processing unit designed to accelerate the creation of images intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send the GPU instructions that instruct the GPU to implement a particular graphics processing task, e.g., render a particular texture that has changed with respect to a previous frame in an image. These instructions may be coordinated by the CPU with a graphics application programming interface (API) in order to issue graphics rendering instructions that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels before outputting the rendered image on a display.

FIG. 1 illustrates a central processing unit in communication with a graphics processing unit of a device. A host 100 includes a central processing unit (CPU) 110 and host memory 120, in which the host 100 is communicatively coupled to a device 130, including a graphics processing unit (GPU) 140, by a bus 108 and/or bus 114. The bus may be, for example, a peripheral component interconnect express (PCI-e) bus, a motherboard-level interconnect, point-to-point serial link bus, or a shared parallel bus. In one embodiment, the bus may have a channel dedicated to a data flow for each direction. For example, a host-to-device bus transmits data from the host 100 to the device 130, and a device-to-host bus transmits data from the device 130 to the host 100.

The device 130 may be, but is not limited to, a mobile device, a desktop computer, a notebook computer, an augmented or virtual reality device, a gaming console device, or any other suitable device. In the illustrated embodiment, the device 130 may include a GPU 140. A GPU is a programmable logic chip (processor) that is specialized for graphics operations and display functions. The GPU renders images, animations and video for a "device's" display. A GPU may be located, for example, in a plug-in card (e.g. a video card), in a chipset on a motherboard (e.g., host 100), or in the same chip as a CPU (e.g., CPU 110).

The GPU 140 may comprise different types of memory for different purposes in different locations within the device 130. The different types of memory may have different access speeds, limitations, and properties. The device 130 may also include a global memory 190 that is external to the GPU 140, a texture cache 158, a constant cache 164, and a shared memory 168 within one or more multiprocessors 160 of the GPU 140. Local GPU memory may refer to any one or more of the texture cache 158, the constant cache 164, and/or the shared memory 168 within the multiprocessor 160 or accessible to a cluster of processing cores 170 and 172.

Each of the multiprocessors may include one or more processing cores (or cores) 170 and 172. In a GPU 140, the processing cores 170 and 172 may also be referred to as a stream processor (SP). Processing cores 170 and 172 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on.

The processing cores 170 and 172 may include registers, such as a general purpose register (GPR) 138 (or register files) that can take instructions and process data according to the instructions. In one embodiment, the processing cores 170 and 172 may be configured such that each processing core 170 and 172 processes different data according to the same instructions for the GPU 140 or multiprocessor 160. In such a case, one instruction unit 165 may be used for each multiprocessor 160.

In one embodiment, the processing cores 170 and 172 may be configured to read and write data to memory, such as shared memory 168 and global memory 190, or just read memory, such as constant cache 164 and texture cache 158. In one embodiment, the processing cores 170 and 172 may be configured to read data from local memory to the multiprocessor 160, such as a multiprocessor's shared memory 168, constant cache 164, texture cache 158, and local GPU memory, but not to another multiprocessor's shared memory 168, constant cache 164, texture cache 158, and local GPU memory.

In one other embodiment, the processing cores 170 and 172 may also be configured to read and write data to global memory 190 which is accessible to each processing core 170 and 172. Local memory may have faster access times or shorter latencies than global memory 190, but global memory 190 may have more accessibility and functionality to the processing cores 170 and 172.

Figure 2:
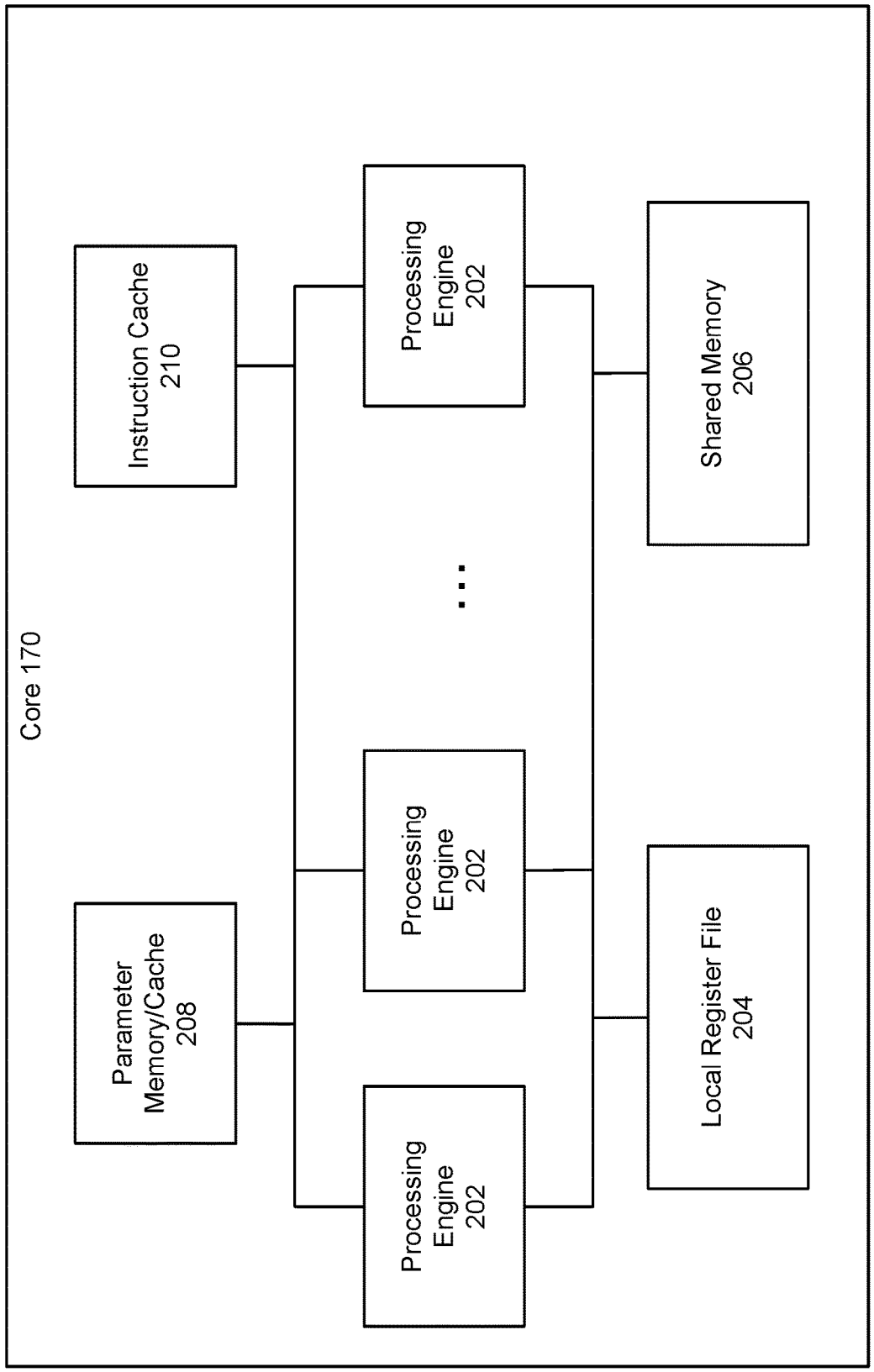
FIG. 2 is an example illustration of a processing core in a multiprocessor of FIG. 1.

FIG. 2 is an example illustration of a processing core in a multiprocessor of FIG. 1. The processing core 170 is configured to execute a large number of threads in parallel. A thread refers to an instance of a particular program executing on a particular set of input data, such as convolutional data. In one embodiment, a single-instruction, multiple-data (SIMD) instruction issue technique is used to support parallel execution of a large number of threads without providing multiple independent instruction caches 210. In other embodiments, a single-instruction multiple-thread (SIMT) techniques is used to support parallel execution of a large number of generally synchronized threads, using a common instruction cache 210 configured to issue instructions to a set of processing engines 202. Unlike an SIMD execution regime, where the processing engines 202 typically execute identical instructions, SIMT execution allows different threads to more readily follow divergent execution paths through a given thread program.

Core 170 (which can be a SIMT parallel processing core) executes instances of a single parallel program on different data across a plurality of parallel processing engines 202 included in the core 170. Thus, for example, the core 170 may be configured to execute a series of common instructions on the parallel processing engines 202 within the core 170. The series of instructions to a single parallel processing engine 202 constitutes a thread, and the collection of a certain number of concurrently executing threads among the parallel processing engines 202 within a core 170 is referred to as a "warp" or "thread group." Additionally, a plurality of related thread groups may be active (in different phases of execution) at the same time on a core 170.

In one embodiment, each core 170 includes an array (e.g., 8, 16, etc.) of parallel processing engines 202 configured to receive SIMT instructions from a single instruction cache 210. Each processing engine 202 may also include a set of functional units (e.g., arithmetic logic units (ALUs), address generation units (AGUs), floating-point unit (FPU), load-store unit (LSU), etc.). The functional units may be pipelined, allowing new instructions to be issued before previous instructions have completed. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.). In one other embodiment, the processing engines 202 are one of the functional units.

Each processing engine 202 stores local input data or intermediate data in a local register file 204, such as a GPR. In one embodiment, the local register file 204 is physically or logically divided into a number of P lanes, each having a number of entries (where each entry may store, for example, a 32-bit word). In one embodiment, a lane is assigned to each processing engine 202, and corresponding entries in different lanes can be populated with data for different threads executing the same program to facilitate SIMT execution. In another embodiment, each processing engine 202 accesses the local register file 204 entries in the lane assigned thereto.

Each processing engine 202 also has access to shared memory 206. In one embodiment, any one or more of the processing engines 202 can read to or write from any location in shared memory 206. In some embodiments, shared memory 206 is implemented as a shared register file. In one other embodiment, shared memory 206 can be implemented using shared cache memory.

In one embodiment, the core 170 includes parameter memory(ies) or cache(s) 208, which may be implemented, for example, as a conventional RAM or cache. Parameter memory/cache 208 can be used, for example, to hold state parameters and/or other data (e.g., various constants) that may be used by multiple threads. Processing engines 202, as discussed above, may also have access to global memory 190 (FIG. 1), which can include, for example, system memory.

In one embodiment, each processing engine 202 is multithreaded and can execute up to a number G (e.g., 24) of a group of threads concurrently, for example, by maintaining current state information associated with each thread in a different portion of its assigned lane in local register file 204.

A thread (or thread of execution) indicates a specific task that may be performed with a set of one or more instructions. Threads allow a graphics application to have multiple tasks performed simultaneously by different units and further allow different graphics applications to share resources. As appreciated, the processing engines 202 are designed to switch rapidly from one thread to another so that instructions from different threads can be issued in any sequence without loss of efficiency.

Instruction cache 210 is configured such that, for any given processing cycle, the same instruction may be issued to each of the processing engines 202. Thus, at the level of a single clock cycle, core 170 implements an architecture substantially representing P number of SIMTs or SIMDs. Since each processing engine 202 is also multithreaded, supporting up to G threads concurrently, core 170 may have up to P*G threads executing concurrently. For example, if P=16 and G=24, then core 170 supports up to 384 concurrent threads.

Core 170 may process threads in "thread groups" (e.g., SIMT thread groups) since the instruction cache 210 can issue the same instruction to each of the processing engines 202 in parallel. As used herein, a "thread group" or "warp" refers to a group of up to P threads of execution of the same program on different input data, with one thread of the group being assigned to each of the processing engines 202. A warp typically has 32 threads and can perform SIMT processing simultaneously in the processing engine 202. In the case of convolution, each thread works on a pixel with multiple input channels. As a result, a warp performs 32 pixel convolutions at a time, where the data (e.g., image) typically consists of a region of 4 rows by 8 columns of pixels with N channels.

In one embodiment, a thread group may include fewer than P threads, in which case some of processing engines 202 will be idle during cycles when that thread group is being processed. In another embodiment, a thread group may include more than P threads, in which case processing will take place over consecutive clock cycles. Since each processing engine 202 can support up to G threads concurrently, it follows that up to G thread groups can be executing in core 170 at any given time.

It is appreciated that the illustrative embodiment is an example and that any number of variations and modifications may be made to the embodiment. For example, any number of processing engines may be included in each core. In some embodiments, each processing engine has its own local register file (or register), and the allocation of local register file entries per thread can be fixed or configurable as desired.

Figure 3:
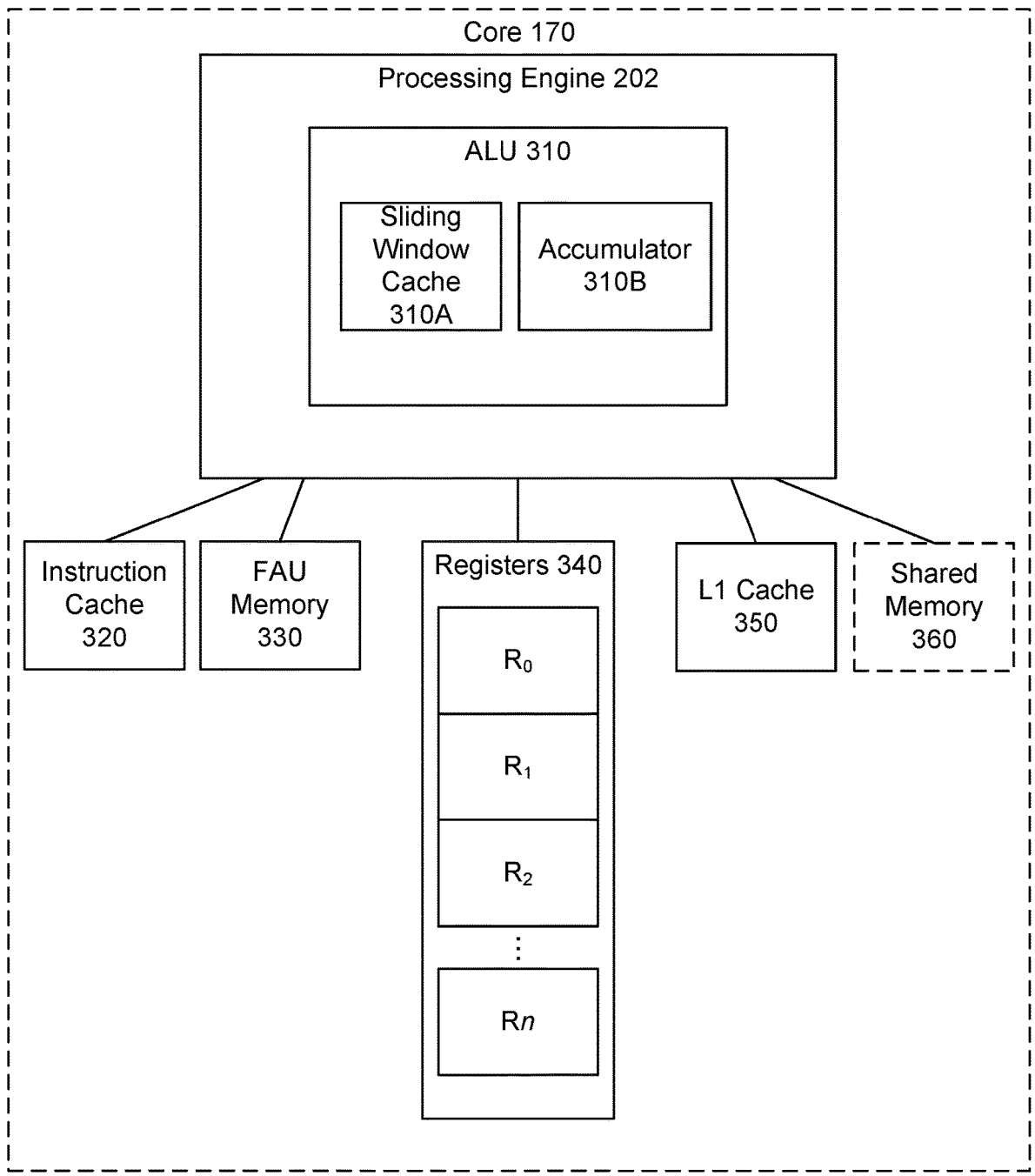
FIG. 3 is an example illustration of a processing engine in a processing core of FIG. 2.

FIG. 3 is an example illustration of the processing engine in a processing core of FIG. 2. The processing engine 202 comprises an arithmetic logic unit (ALU) 310. In one embodiment, and as depicted, the ALU 310 includes a sliding window cache 310A and an accumulator 310B. In one other embodiment, the processing engine 202 is an ALU 310, as opposed to the ALU being a functional unit within the processing engine 202. The processing engine 202 may also be communicatively coupled to an instruction cache 320, a fast access uniform (FAU) memory 330, a general purpose register (GPR) (or register or register file) 340, an L1 cache 350, and a shared memory 360.

The ALU 310 is a hardware processor that is capable of performing multiply and add operations for graphics functions such as shading, convolution, pooling, and other operations by executing thread groups or warps.

In one embodiment, a sliding window function may be performed with use of the sliding window cache 310A to store calculations performed by the ALU 310. Any number of sliding window operations may be implemented including, but not limited to, Harris Corner Detector, two-dimensional (2D) correlation, 2D convolution, Gaussian Filter, Kanade-Lucas-Tomasi (KLT) feature tracker, Nagao Matsuyama filter, and algorithms that require the sum of absolute differences and Sobel Filter.

As used herein, a sliding window operation may refer to performing an operation on a selection or a "window" of data elements of a data set (e.g., the data set illustrated in FIG. 5A, discussed below) and moving, shifting or sliding the window across the data elements of a data set, each time performing the operation on the selected data. The movement of the window may be virtual, or a data construct. For example, a sliding window operation may include sliding the window across an array of data elements, at a raster scan. In one embodiment, the sliding window cache 310A comprises one or more buffers such that the sliding window cache 310A may store pixels for a warp at each iteration of the ALU 310 in a first buffer and copy pixels that will be used in a subsequent iteration into a second buffer. The sliding window techniques, while employable in various embodiments, is not a focus of this disclosure.

The accumulator 310B allows for math-intensive processing, such as addition, multiplication, multiply-accumulate (MA) and shift-accumulate. The accumulator may also buffer intermediate calculations until they are no longer needed.

The instructions cache 320 stores instructions. A thread may decode instructions from the instruction cache 320 and execute the instructions in the ALU 310. The instructions cache 320 may be, for example, a ROM or another suitable form of memory.

The FAU memory 330 may also be a ROM or another suitable form of memory. The FAU memory 330 stores weights 580 (FIG. 5B) or other constants used during processing and window sliding computations in the ALU 310.

The register 340 (or GPR) is logically partitioned so that each thread has its own non-overlapped space, although multiple threads may access a space of the shared memory 360 at the same time. The ALU 310 reads from and writes to the register 340, where data for the register 340 is primarily obtained from the L1 cache 350. In the illustrated embodiment, the register 340 includes registers $R_0$-$Rn$, where n is a positive integer and may be based on a capacity of the register 340.

The L1 cache 350 is a primary, fastest cache in the core 170. The L1 cache 350 obtains data from an external memory, not shown. In one embodiment, the register 340, the L1 cache 350, and the shared memory 360 are RAMs or other suitable forms of memory.

For a convolution operation (described in more detail below with reference to FIG. 4), the ALU 310 applies a filter to an input image in order to obtain an output image. The input image comprises input pixels, and the output image comprises output pixels. Pixels represent data at coordinates (x,y) for each channel, where the channels are discrete components of the image. For example, an RGB image comprises three channels: a red channel, a green channel, and a blue channel. Typically, thread 0 of a warp performs calculations on a first group of the input pixels, thread 1 of the warp performs calculations on a second group of the input pixels, and so on. As appreciated, a thread performs calculations by the processing engine 202 (or more specifically the ALU 310) executing instructions stored in memory and performing associated calculations.

Traditionally, in order perform associated calculations, each thread uses pixels associated with other threads. Such pixels may be referred to as shared pixels. However, the register 340 cannot store shared pixels. Thus, in order to share pixels of the image, the ALU 310 may first move pixels from the register 340 to the shared memory 360 to create the shared pixels. Subsequently, the shared pixels are moved to the register 340 such that each thread in a warp has its own copy of the shared pixels. However, read and write operations involving the shared memory 360 reduce operation speed and increase power consumption.

In order to increase operation speed and decrease power consumption, embodiments of the disclosure provide processing operations (e.g., ALU-centric operations) in the GPU 140 (FIG. 1). The L1 cache 350 loads pixels into the register 340 using a pixel mapping, independently of a filter size and fixed relative to register location, described below.

Once the pixels are loaded into the register 340, the processing engine 202 (or ALU 310) may read the pixels from the register 340 and store the pixels as a sliding window in a sliding window cache 310A instead of in shared memory 360. This eliminates read and write operations associated with the shared memory 360, which in turn improves the speed of operations, reduces power consumption, and eliminates the need for the shared memory 360. By storing the pixels in the sliding window cache instead of in a shared memory, the ALU 310 stores the pixels independently of the shared memory 360

During a sliding window operation, as described briefly above and in more detail below (with reference to FIG. 5B), the sliding window slides in a contiguous manner and in a traversing pattern. For example, the sliding window has H×W positions in a region of (4+H−1)×(8+W−1) of pixels (e.g., in a 4×8 warp pixel layout). The H×W positions may be traversed using any number of methods, such as a scan line order (i.e., traversing the first line from left to right, then to the second line, followed by left to right again, and so on) or scanning the first line from left to right, followed by the second line from right to left, the third line from left to right, and so on.

Using the sliding window operation further improves the speed of operations and reduces power consumption as data may be reused. For example, when shifting the sliding window from left to right by one column, the pixel data in the second to $8^{th}$ column of the sliding window cache 310A are shifted into the left neighbor (e.g., in a 4×8 warp layout). The shifted data may then be used in subsequent cycles, which eliminates the need to fetch them from registers (GPR) 340 (the $8^{th}$ column data are fetched from GPR for subsequent use). The accumulator 310B may then buffer intermediate calculations until the threads no longer require intermediate calculations, which also reduces hardware requirements and further reduces power consumption. That is, intermediate data is saved in the accumulator 310B and avoids outputting the data into the GPR 340 and reading them back again from the GPR 340. As appreciated, the embodiments apply to convolution, pooling, and other operations for pixels and other data.

Figure 4:
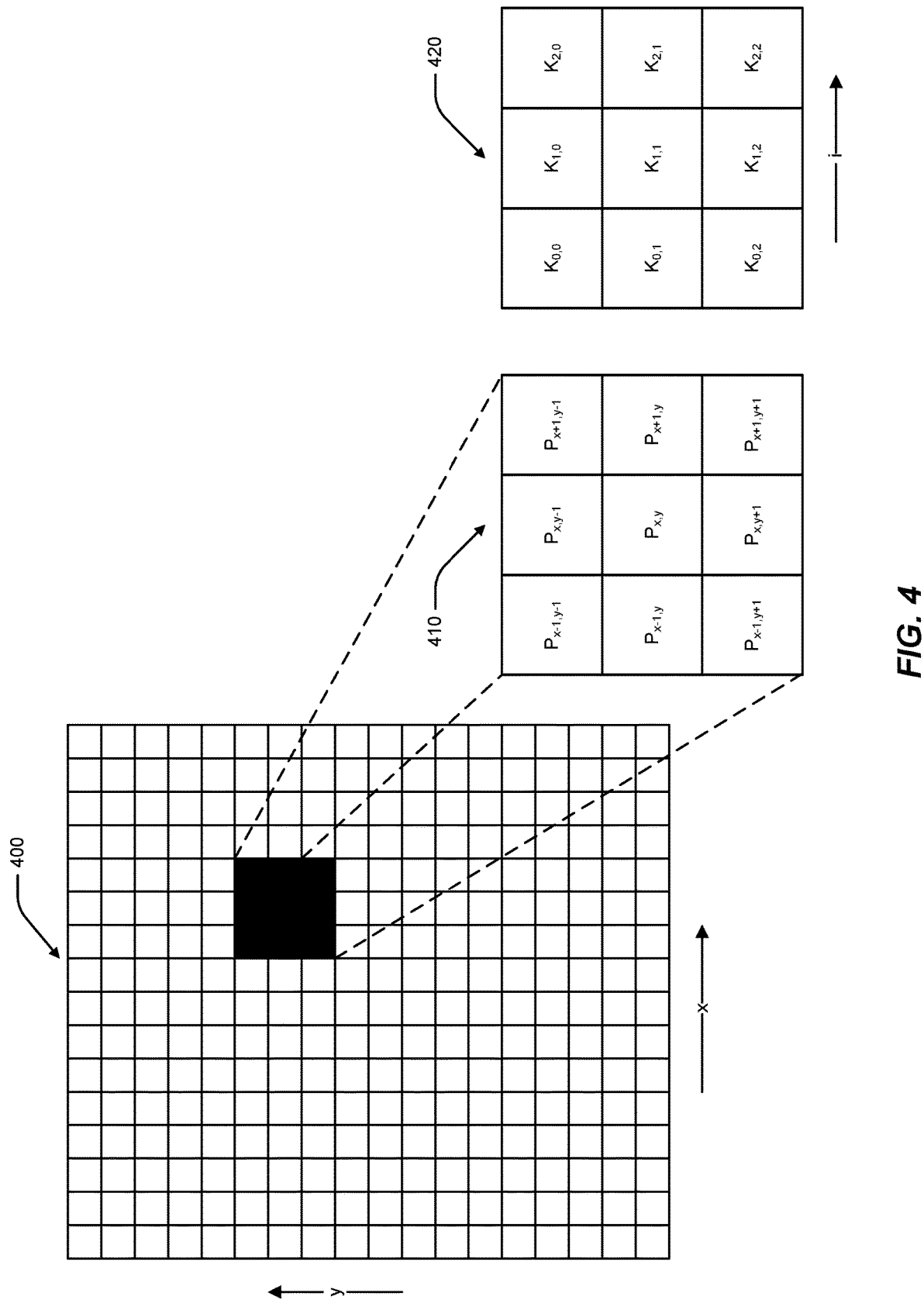
FIG. 4 shows convolution filtering of a grid within an image.

FIG. 4 shows convolution filtering of a grid within an image. For convolution filtering, an H×W grid of picture elements (pixels) is multiplied element-by-element with an H×W grid of convolution coefficients, where H is the height and W is the width of each grid. H×W intermediate results from the element-by-element multiplies are accumulated to obtain a final result for one pixel position. The same convolution computation may be repeated for many (e.g., all) pixel positions in an image. The convolution computation for one pixel position requires H×W multiply and accumulate operations.

More specifically, image 400 may include any number of pixels in the horizontal (x) direction and any number of pixels in the vertical (y) direction. In the example shown, convolution filtering is performed on a 3×3 grid 410 of nine pixels $p_{x-1,y-1}$ through $p_{x+1,y+1}$ with a 3×3 kernel 420 of nine coefficients $k_{0,0}$ through $k_{2,2}$ to generate a new pixel at position (x,y). A convolution kernel is a set of coefficients used for convolution filtering. The coefficients may also be referred to as weights. While a 3×3 grid 410 and kernel 420 are illustrated, it is appreciated that the disclosure is not limited to such a convolution filter and that any size filter may be employed.

Convolution filtering may be classified into two types—general and separable. For general convolution filtering, the kernel coefficients are functions of both x and y, and the horizontal and vertical directions are not divisible. For separable convolution filtering, the kernel coefficients are functions of either x or y, and the horizontal and vertical directions are divisible.

General convolution filtering may be expressed as:

$$p'_{x,y} = S \cdot \left( \sum_{i=0}^{W-1} \sum_{j=0}^{H-1} k_{i,j} \cdot p_{x+i-shiftX, y+j-shiftY} \right) + b$$

where W is the width of the grid/kernel and H is the height of the grid, $k_{i,j}$ is a kernel coefficient at position (i, j) in the grid, S is a scaling factor and b is a bias value, $p_{x,y}$ is an original pixel at position (x, y) in the image, $p'_{x,y}$ is a filtered pixel that replaces the original pixel at position (x, y), shiftX is an offset from position (x, y) to the left of the grid, and shiftY is an offset from position (x, y) to the bottom of the grid.

S may be a normalization factor of $$S = \left( \sum_{i=0}^{W-1} \sum_{j=0}^{H-1} k_{i,j} \right)^{-1}$$

or some other value.

Separable convolution filtering may be expressed as:

$$p'_{x,y} = S \cdot \left( \sum_{i=0}^{W-1} \sum_{j=0}^{H-1} k_i \cdot k_j \cdot p_{x+i-shiftX, y+j-shiftY} \right) + b$$

where $k_i$ is a kernel coefficient at horizontal position i in the grid, and $k_j$ is a kernel coefficient at vertical position j in the grid. The kernel coefficient at position (i, j) may be derived as: $k_{i,j} = k_i \cdot k_j$.

In the example shown in FIG. 4, W=3, H=3, shiftX=0, and shiftY=0. In general, shiftX is approximately half of the width, and shiftY is approximately half of the height. ShiftX may be defined as shiftX=$\lfloor(W-1)/2\rfloor$ and ShiftY may be defined as shiftY=⌊(H−1)/2⌋, where ⌊a⌋ denotes a floor operator that gives the next lower integer value for a.

Different types of convolution filtering and different kernels may produce different effects in the filtered image. In one embodiment, a graphics application may select the type of convolution filtering to perform and the kernel to use based on image processing quality and feature requirements.

Figures 5A, 5C:
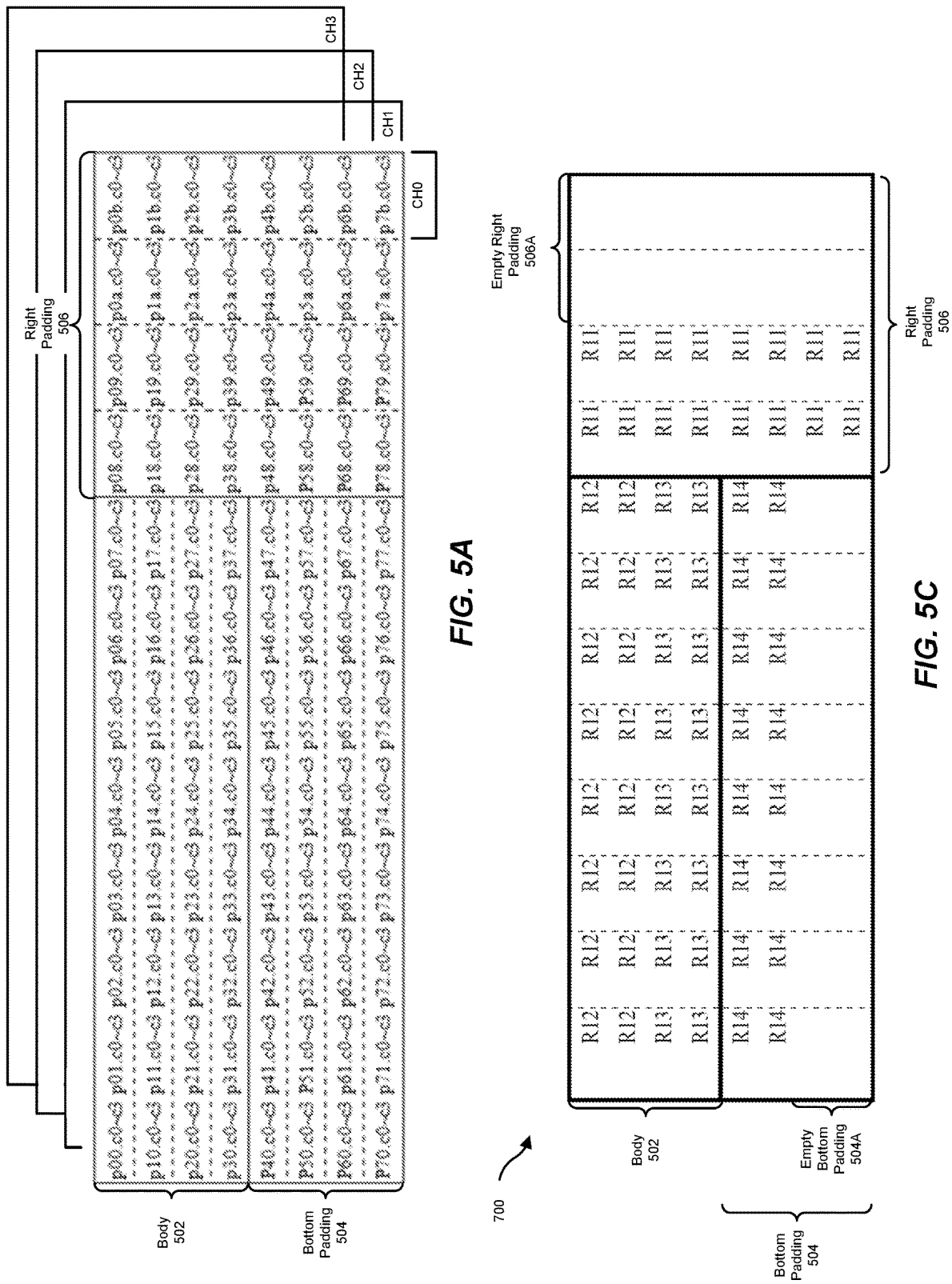
FIG. 5A is an example diagram showing pixel data corresponding to an image.
FIG. 5C illustrates an example of mapping pixel data into a register with a half warp granularity scheme in accordance with embodiments of the disclosure.

FIG. 5A is an example diagram showing pixel data corresponding to an image. Specifically, the diagram shows an example of per warp pixel data involved in a convolution with a 5×5 filter and 16 bit per channel tensor format. The illustrated layout shows a memory when a level 1 (L1) cache fetches pixels of an image from an external memory into the L1 cache. As depicted, the pixel data (data elements of a data set) comprise three regions—a body 502 (e.g., top 4×8 pixels), a bottom padding 504 (e.g., bottom 4×8 pixels) and a right padding 506 (e.g., right 8×4 pixels). The number of rows in the body 502 is determined by the filter size H×W. The number of rows in the bottom padding 504 is determined by the number of rows (or height) H−1. The number of columns in the right padding 506 is also determined by the filter size H×W, where the number of columns (or width) W−1 is the number of columns.

The pixels in each of the body 502, the bottom padding 504 and the right padding 506 are denoted as pij.c0~c3, where pij is a pixel and c0~c3 denotes each of channels CH0, CH1, CH2 and CH3. Together, the regions form 8 rows by 12 columns, where 0≤i≤7, 0≤j≤b, a=10, and b=11. Accordingly, the pixels in the body 502 comprise pixels p00.c0~c3 to p37.c0~c3, the bottom padding 504 comprise pixels p40.c0~c3 to p77.c0~c3, and the right padding 506 comprise pixels p08.c0~c3 to p7b.c0~c3.

Figure 5B:
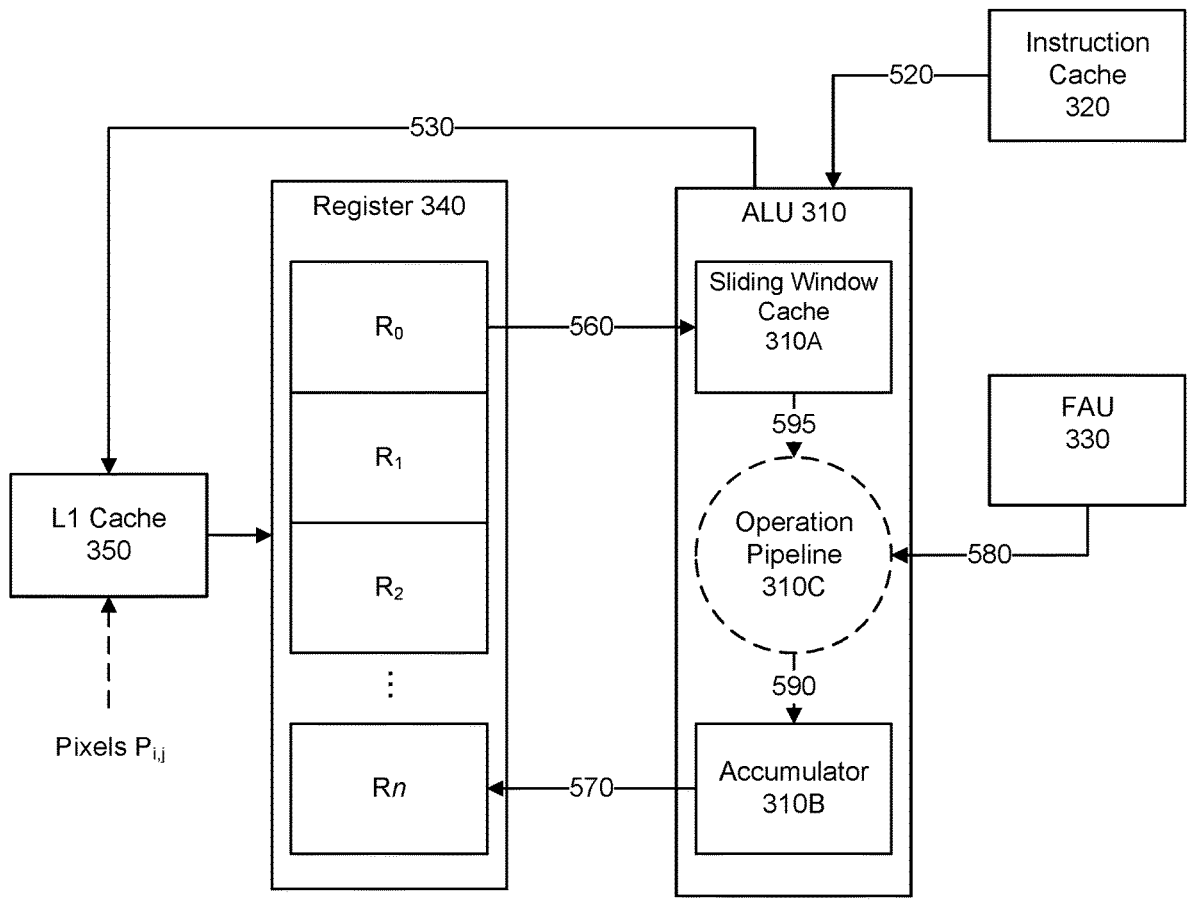
FIG. 5B is an example flow diagram demonstrating a convolution operation applied to the pixel data of FIG. 5A.

FIG. 5B is an example flow diagram demonstrating a convolution operation applied to the pixel data of FIG. 5A. In the discussion that follows, the core 170 performs a convolution operation. More specifically, in one embodiment, the ALU 310 performs the convolution operation by executing a convolution operation instruction stored in the instructions cache 320. However, it is appreciated that any other functional unit or processing unit may implement the processes described herein, and the disclosure is not limited to implementation by the core 170 and/or ALU 310.

The convolution operation instruction instructs the ALU 310 and other components of the core 170 to perform actions on a per-warp basis (i.e., if the warp comprises 32 threads, then the 32 threads simultaneously run the convolution operation instruction). Initially, the ALU 310 obtains a load instruction 520 from the instructions cache 320, and the ALU 310 sends the load instruction 530 to the L1 cache 350. The L1 cache 350 executes the load instruction 530 by retrieving the pixels $P_{i,j}$ from an external memory (not shown), followed by loading the pixels $P_{i,j}$ into the registers $R_0$-$R_n$ in the register 340 using a pixel mapping. The L1 cache 320 does so on a per-warp basis, meaning each thread of the warp loads the channels CH0-CH3 of one pixel $P_{i,j}$ at a time. In this example, since the warp comprises 32 threads, the warp loads 32 pixels $P_{i,j}$ at a time. However, it is appreciated that the disclosure is not limited to 32 threads, and that any number of threads (e.g., 8, 16, etc.) threads may be used. Various embodiments of pixel mapping will be discussed below with reference to the various figures.

Subsequently, the ALU 310 reads the pixels $P_{i,j}$ from registers in the body 502, stores the pixels $P_{i,j}$ as the sliding window 595 in a first buffer (not shown) of the sliding window cache 310A, and copies into a second buffer (not shown) the pixels $P_{i,j}$ to be used later on. The ALU 310 uses the sliding window 595 from the sliding window cache 310A and a first weight 580 from the FAU 330 to calculate a dot product 590 for each of the pixels $P_{i,j}$, stores the dot products 590 in the accumulator 310B, shifts the sliding window 595 according to a traversing pattern 560, and repeats the process until the convolution operation is complete.

In one embodiment, the traversing pattern uses a stride of 1 and comprises sliding the window to the right by one column W−1 times until reaching a right-most position, sliding down one row and left to the farthest left column, and repeating the pattern. In this context, W is a positive integer equal to a width of the filter, as described above. In another embodiment, the sliding window 595 slides according to another traversing pattern. For instance, the traversing pattern could comprise sliding from right to left or in any other direction towards boundaries of the pixels $P_{i,j}$.

The dot products 590 may be referred to as intermediate calculations because they occur before the convolution operation ends by adding the dot products 590.

If the sliding window 595 is 4×8 and the ALU 310 uses a filter of size H×W to perform the convolution operation, then the size of the region of the pixels $P_{i,j}$ used is determined as (4+H−1)×(8+W−1). In that case, the sliding window 595 slides a total of H×W times. If the image comprises 4 channels (e.g., CH0-CH3), then the ALU 310 calculates the output image 570 as follows:

output(row,column)=sum($I$[row+$j$,column+$i$,$k$]×$F$[$j$,$i$,$k$]), where I is an input image, F is a filter, 0≤i≤S, 0≤j<R, and 0≤k≤3. For each term, the input from I is the data for the sliding window 595 at position (j,i), the input from F is the weight at (j,i) stored in the FAU 330 and corresponding to the sliding window 595 at position (j,i), and k is a channel. The formula therefor defines the convolution of I and F. The ALU 310 performs S×R steps to complete an operation pipeline 310C. The accumulator 310B adds the dot products 590 from the operation pipeline 310C to calculate the output image 570, the accumulator 310B passes the output image 570 to the register 340, and the register 340 stores the output image 570.

FIG. 5C illustrates an example of mapping pixel data into a register with a half warp granularity scheme in accordance with embodiments of the disclosure. In the mapping depicted in the figure, there is a granularity of half a warp (i.e. 16 pixels) with 8 bytes per pixel into the general purpose register (i.e., register 340) using a 3×3 filter. The registers $R_0$-$R_n$ of GPR 340 are loaded in a specific layout, with the registers in the right padding 506 in ordered number before the anchor register (in this example, register R12) in the body 502. In one embodiment, the order of the register numbers are in reverse order (e.g., lower numbered registers appear in the right padding, such as register R10).

In one non-limiting embodiment, each register $R_n$ is a half-warp that includes 16 threads. Using a half warp implementation and registers of 1024 bits, anchor register R12 has 1024 bits in the GPU 140. Any thread in a warp (with 32 threads) can access a respective portion of anchor register R12 (i.e., each thread can access 32 bits). For example, thread 0 accesses bits[31:0] of the 1024 bits, thread 1 accesses bits[63:32], and so on. Following this example,
Thread 0 loads p00.c0 into bits[15:0], p00.c1 into bits[31:16], p00.c2 into bits[512+15:512], p00.c3 into bits[512+31:512+16], thread 1 loads p01.c0 into bits[47:32], p01.c1 into bits[63:48], p01.c2 into bits[512+47:512+32], p01.c3 into bits[512+63:512+48], . . . .

Thread 7 loads p07.c0 into bits[7×32+15:7×32], p07.c1 into bits[7×32+31:7×32+16], p07.c2 into bits[512+7×32+15:512+7×32], p07.c3 into bits[512+7×32+31:512+7×32+16], Thread 8 loads p10.c0 into bits[8×32+15:8×32], p10.c1 into bits[8×32+31:8×32+16], p10.c2 into bits[512+8×32+15:512+8×32], p10.c3 into bits[512+8×32+31:512+8×32+16], . . . .

Thread 15 loads p17.c0 into bits[15*32+15:15×32], p17.c1 into bits[15*32+31:15×32+16], p17.c2 into bits [512+15*32+15:15×32], p17.c3 into bits[512+15*32+31:15×32+16]. Note that the above scheme is to load 16 pixels (i.e. p00~p17), 64 bits per pixel, into one register, i.e. R12.

Similarly, the next 16 pixels (p20~p37) may be loaded into register R13.

In one embodiment, the bottom padding 504 begins at a register number that is the anchor register (in this example, R12)+2. For example, since the anchor register is register R12, the bottom padding 504 begins at register R14 (R12+2=R14). Moreover, the filter is independent of and fixed relative to register location, and results in a fewer number of registers being occupied, particularly for smaller filters. For example, as shown, the bottom padding 504 has an empty bottom padding 504A and the right padding has an empty right padding 506A that would otherwise be occupied. Due to the register numbering layout, the mapping 700 is formed as a contiguous ordered number of registers. Half warp granularity without this register numbering scheme would result in holes (or gaps) in the register block.

In one embodiment, loading contiguously (or loading a contiguous number) is defined as loading the registers in sequence (or sequential order) and/or loading the registers next to or together in sequence. In another embodiment, loading contiguously is defined such that registers are loaded without any holes or gaps present in a block of the registers.

In one embodiment, having a half warp granularity, mapping the pixels $P_{i,j}$ from the pixel data (FIG. 5A) to the registers $R_0$-$R_n$ in the body 502 and the bottom padding 504 includes loading 16 pixels×first 4B per pixel (horizontally) into the lower 512 bits of a register (e.g. register R12), and 16 pixels×second 4B per pixel (horizontally) into the higher 512 bits of the same register (e.g. register R12). In the right padding 506, 16 pixels×first 4B per pixel (vertically) are loaded into the lower 512 bits of a register (e.g. register R11), and 16 pixels×second 4B per pixel (vertically) are loaded into the higher 512 bits of the same register (e.g. register R11). A more detailed explanation follows.

In the depicted example, a 3×3 filter size is used in the convolution operation. As noted above, the number of rows in the body 502 and the bottom padding 504 is based on the filter size. For a 3×3 filter, the body 502 and the bottom padding 504 have 2 rows (or a height (H) of 2), and the right padding 506 has 2 columns (or a width (W) of 2). It is appreciated that while the discussion that follows uses a 3×3 filter size, the disclosure is not limited to a 3×3 filter, but may be any filter size that is smaller than a 5×5 filter.

To load the registers $R_0$-$R_n$ with the pixels $P_{i,j}$ from the pixel data (FIG. 5A), the L1 cache 350 separates the pixels $P_{i,j}$ into the three regions—the body 502, the bottom padding 504 and the right padding 506, described above. The number of pixels in the body 502 is equal to the number of threads in the warp. Accordingly, in the example, there are 32 pixels. The 32 pixels from the body 502 form a 4×8 rectangle (i.e., a rectangle having a width of 8 pixels and a height of 4 pixels). The number of pixels $P_{i,j}$ in the bottom padding 504 and the number of pixels $P_{i,j}$ in the right padding 506 are based on the height (2) and width (2), as noted above. Accordingly, for a 3×3 filter, there are 16 pixels in the bottom padding 504 that form an 2×8 rectangle (i.e., a rectangle having a height of 2 pixels and a width of 8 pixels) and 16 pixels in the right padding 506 that form a 8×2 rectangle (i.e., a rectangle having a height of 8 pixels and a width of 2 pixels). Notably, the effective pixel height is 6 pixels (as two rows or columns of pixels are not occupied). However, when loading data from L1 cache 350 to GPR 340, the granularity is 8 pixels in height.

After separating the pixels into regions, the L1 cache 350 loads the pixels $P_{i,j}$ into the registers $R_0$-Rn. In one embodiment, loading begins with an anchor register R12 indicated by the load instruction 530.

In one embodiment, the L1 cache 350 loads the pixels $P_{i,j}$ based on offsets from the anchor register R12, such that each channel CH0-CH3 (c0~c3) for a 64-bit pixel $P_{i,j}$ may be loaded into a single register Rn. Specifically, the L1 cache 350 loads the respective pixels $P_{i,j}$ into the body 502 and the pixels $P_{i,j}$ into the bottom padding 504 based on a positive offset, and the L1 cache 350 loads the respective pixels $P_{i,j}$ into the right padding 506 based on a negative offset.

Within the context of the disclosure, a positive offset is an offset based on the register size. For example, if each register $R_0$-$R_n$ is 1024 bits, then the positive offset from register R12 to R13 is 1024, and the positive offset from register R12 to register R14 is 2048, and so on. In this manner, the L1 cache 350 loads the pixels $P_{i,j}$ from body 502 into register R12 until full, followed by loading pixels $P_{i,j}$ into register R13. Subsequently, the L1 cache 350 loads pixels $P_{i,j}$ into the bottom padding 504 using register R14. Since the bottom padding 504 is limited to 16 pixels, a single register $R_n$ may be used to load the pixel data. For example, pixels p40.c0~c3 to p57.c0~c3 may be loaded into the lower and higher 512 bits of register R14 in the bottom padding 504.

A negative offset is an offset that is also based on the register size, but in the opposite direction of the positive offset. For example, if each register $R_0$-$R_n$ is 1024 bits, then the negative offset from register R14 to R13 is −1024, and the negative offset from register R13 to register R12 is −2048, and so on.

In one embodiment, the offsets are fixed offsets, where a positive number indicates a higher register number and a negative number indicates a lower register number. For instance, a fixed offset of 2 from anchor register R12 is register R14, and a fixed offset of −3 from anchor register R12 is R9 (not shown).

In one further embodiment, the L1 cache 350 loads the pixels $P_{i,j}$ into registers R12, R13 of the body 502 and into register R14 of the bottom padding 504 in a horizontal manner. For example, the L1 cache 350 loads the pixels $P_{i,j}$ into register R12 beginning with pixel p00.c0~c3 (FIG. 5A) and proceeding horizontally to pixel p07.c0-c3, then moving to pixel p10.c0-c3 and proceeding horizontally to pixel p17.c0~c3. Subsequently, the L1 cache 350 loads the remaining pixels p20.c0-c3 to p37.c0-c3 from the body 502 into register R13, followed by the pixels p40.c0-c3 to p77.c0~c3 in the bottom padding 504 into registers R14.

The L1 cache 350 then loads the pixels $P_{i,j}$ into the register R11 of the right padding 506 in a vertical manner. For example, the L1 cache 350 begins by loading the pixels $P_{i,j}$ of the right padding 506 into register R11 starting with pixel p08.c0~c3 and proceeding vertically to pixel p78.c0~c3, then moving to pixel p09.c0~c3 and proceeding vertically to pixel p79.c0~c3. Since the right padding 506 is limited to 16 pixels, a single register $R_n$ may be used to load the pixel data. For example, pixels p08.c0~c3 to p79.c0~c3 may be loaded into the lower and higher 512 bits of register R11 in the right padding 506.

In one embodiment, per pixel data location in a register $R_0$-$R_n$ is filter independent with respect to the anchor register (e.g. register R12). Accordingly, if a pixel is located in a particular region, then the location the pixel is mapped to in the register 340 (FIG. 3) does not depend on the filter size.

Figure 6A:
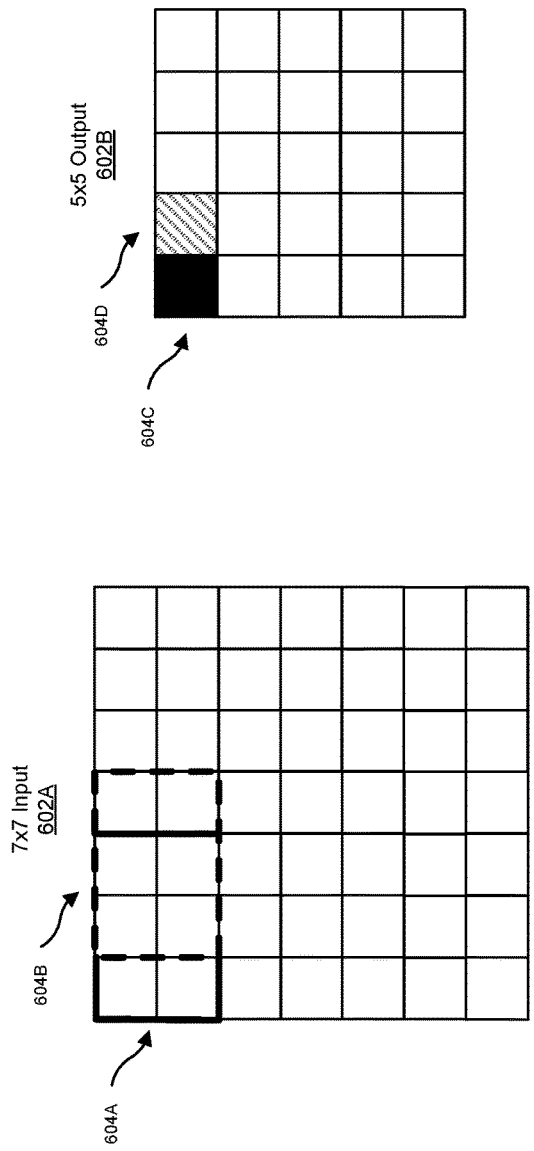
FIGS. 6A and 6B illustrate filters with a stride and dilation.
Figure 6A:
Figure 6B:
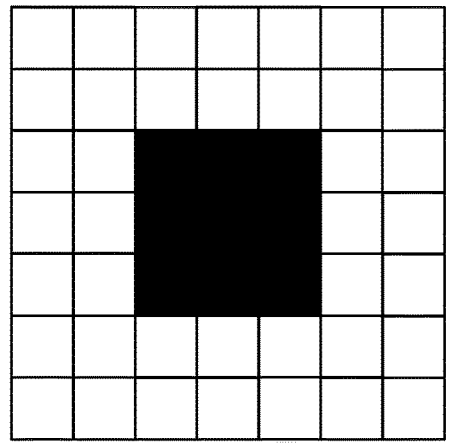

FIGS. 6A and 6B illustrate filters with a stride and dilation. Filter parameters may be modified to adjust the stride and dilation. As shown in FIG. 6A, a convolution with a stride of 1 is depicted. Within the context of a convolutional neural network (CNN), stride represents the step of a convolutional operation and controls how an applied filter convolves around an input. In a typical scenario, and as depicted in the figure, a filter (in this case, a 3×3 filter) convolves around the input 602A (in this case, a 7×7 input volume) by shifting per step at a time. In the disclosed embodiment, the step is one unit, such that the filter is shifted 1 unit of pixels in the 7×7 input. This amount is referred to as the stride, which is normally set such that the output is an integer (not a fraction). For example, the 3×3 filter is first applied to pixels within section 604A (solid rectangle) and then adjusted (stepped one unit) so as to be applied to the pixels within section 604B (dashed rectangle). The output of the convolution of 7×7 input 602A results in a 5×5 output 602B with convolved outputs 604C and 604D.

Turing to FIG. 6B, a dilated convolution is depicted with a dilation of 1 (606A) and a dilation of 2 (606B). A dilated convolution is a convolution in which an input is applied with defined gaps. Stated differently, the dilation rate is a spacing between each pixel in the convolution filter. Applying a dilated convolution allows for an increasing receptive field view (a receptive field is the implicit area captured on the initial input by each input to the next convolution layer). For example, a 3×3 filter with a dilation rate of 2 will have a same view field as a 5×5 filter.

For purposes of discussion, if we assume a two-dimensional (2D) image as the input, a dilation rate of 1 is a normal convolution, whereas a dilation rate of 2 means skipping one pixel per input. As illustrated, the black dots represent inputs to a 3×3 filter and the shaded gray regions represent the receptive field captured by each of these inputs. As illustrated, 606A shows a 1-dilated convolution, where each element has a receptive field of 3×3, and 606B shows a 2-dilated convolution, where each element has a receptive field of 7×7 (increased as a result of the dilation rate of 2).

If the same pixel mapping is used to load data from L1 cache 350 into the GPR 340 during a 2-dilated convolution, when convolution is conducted in the ALU 310, threads in a warp (which correspond to dark gray pixels in 606B) are not active in the convolution. That is, in this example, only a quarter of the threads in a warp are active, which reduces the ALU 310 computational power and decreases the ALU 310 overall efficiency.

Figure 7:
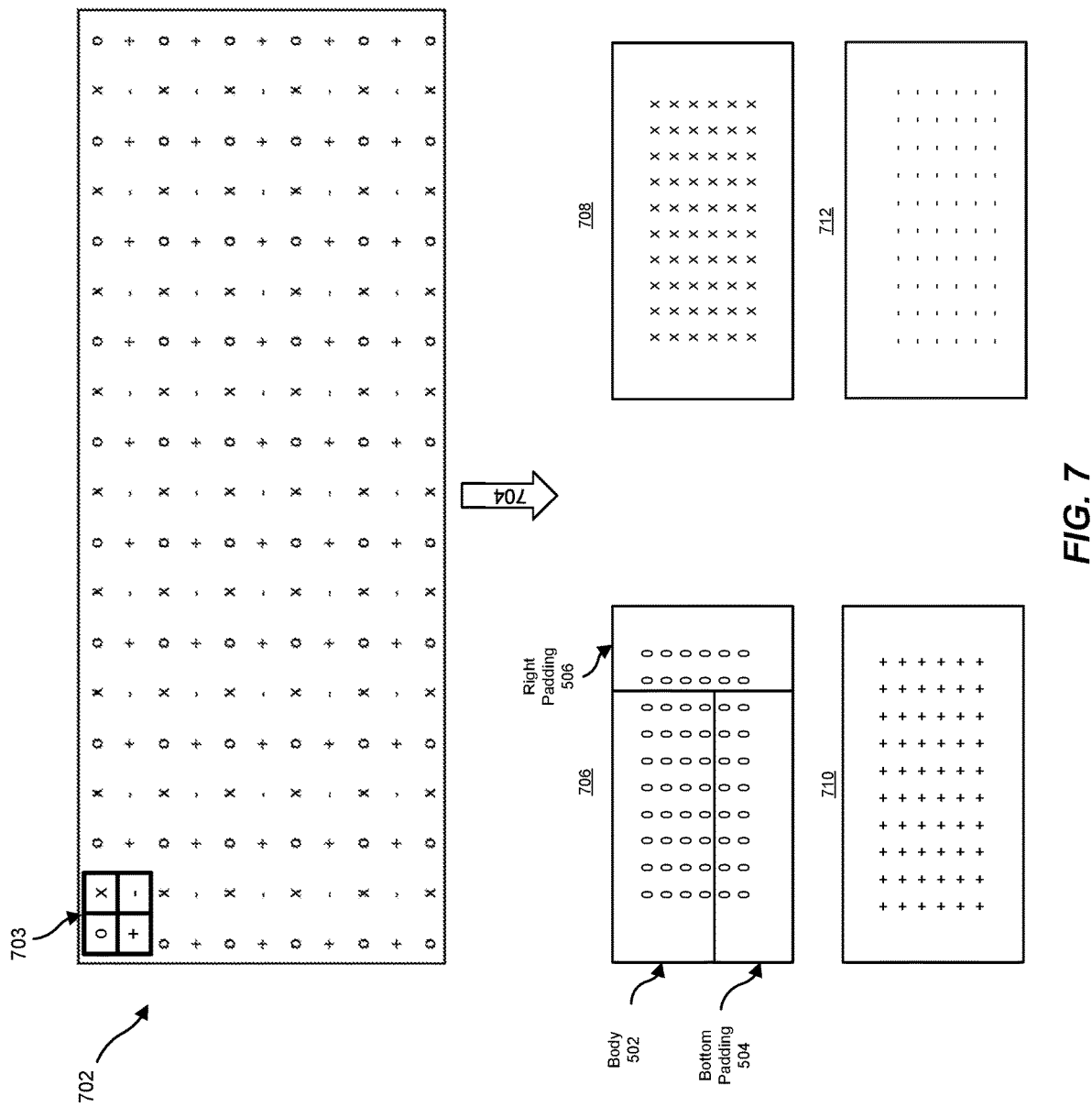
FIG. 7 illustrates separating pixel data into quads for mapping into registers.

FIG. 7 illustrates separating pixel data into quads for mapping into registers. In one embodiment, an L1 cache 350 mapping scheme maps convoluted pixel data for a filter with a stride of 2 into registers of GPR 340. In one embodiment, for a filter with a stride of 2, the filter size does not exceed 7×7. In another embodiment, for a filter with a dilation of 2, the filter size does not exceed 5×5. The pixel data may be separated into groups in order to convert the filter of stride 2 or dilation 2 into multiple, smaller filters of stride 1 and dilation 1, respectively. The L1 cache 350 may then map the convoluted pixel data of the smaller filters having a stride of 1 and dilation of 1 into GPR 340, as discussed in the above-mapping scheme (e.g., FIGS. 5A-5C) and further below.

For a convolution with an H×W filter having a stride of 2, L1 cache 350 will fetch an (8+H−2)×(16+W−2) region 702 of pixels, where H≤7 and W≤7 such that the filter size is 7×7 or less. For convolution with an H×W filter having a dilation of 2, L1 cache 350 will fetch an (8+2H−2)×(16+2 W−2) region 702 of pixels, where H≤5 and W≤5 such that the filter size is 5×5 or less. For example, a filter of size 5×5 with a stride of 2 produces a region 702 with 11×19 pixels (depicted in FIG. 7), whereas a filter of size 5×5 with a dilation of 2 produces a region 702 with 16×24 pixels (not shown).

In either embodiment (e.g., a filter with stride 2 or dilation 2), the pixels in region 702 of convoluted pixel data are divided into a quad 703. A quad 703 consists a 2×2 region of pixels (i.e., four regions) with each region including a pixel. In one embodiment, the pixel types are different in each region of the quad 703. For example, as depicted, the quad 703 consists of four different pixel types, namely, a pixel represented by type "o," a pixel represented by type "x," a pixel represented by type "+" and a pixel represented by type "−." Although the disclosed embodiment relates to dividing convoluted pixel data into quads, it is appreciated that the convoluted pixel data may also be divided according to other sizes and is not limited to quads.

For each different type of pixel in the quad 703, a group of pixels will be formed (as indicated by arrow 704). For example, and based on the filter having a stride of 2, pixels of type "o" will be grouped in a first group 706, pixels of type "x" will be grouped in a second group 708, pixels of type "+" will be grouped in a third group 710 and pixels of type "−" will be grouped in a fourth group 712.

In one embodiment, the pixels in each group 706-712 are stored in L1 cache 350 for mapping into GPR 340. For each of the groups 706-712, the pixels read from the L1 cache 350 by ALU 310 are separated into three regions-a body 502, a bottom padding 504 and a right padding 506. For example, the pixels in the first group (e.g., pixels represented by type "o") are separated into three regions. The body 502 includes a first set of pixels from the pixels in the first group, the bottom padding 504 includes a second set of pixels from the pixels in the first group and the right padding 506 includes a third set of pixels from the pixels in the first group. The pixels of type "x" in the second group, the pixels of type "+" in the third group and the pixels of type "−" in the fourth group are similarly separated into three regions.

More specifically, and with reference to FIG. 5C and for the first group 706 of pixels, the first set of pixels (e.g., p00.c0~c3, p02.c0~c3, . . . p0e.c0~c8, p20.c0~c3, p22.c0~c3 . . . p2e.c0~c3, p40.c0~c3 . . . p4e.c0~c3, p60.c0~c3 . . . p6e.c0~c3, where e=14) are loaded into one or more first registers (e.g., registers R12-R13) in the body 502 in a horizontal manner. The second set of pixels (e.g., p70.c0~c3, p72.c0~c3 . . . p7e.c0~c3, p90.c0~c3, p92.c0~c3 . . . p9e.c0~c3) are loaded into one or more second registers (e.g., register R14) in the bottom padding 504 in a horizontal manner. The third set of pixels (e.g., p0g.c0~c3, p2g.c0~c3, . . . pag.c0~c3, p0i.c0~c3, . . . pai.c0~c3, where g=16, i=18) are loaded into one or more third registers (e.g., register R11) in the right padding 506 in a vertical manner. In one embodiment, each of the registers in the first, second and third set of registers are loaded as a contiguous ordered number of registers in the GPR 340. The second, third and fourth groups 708-712 of pixels may be loaded in a similar manner.

Once the pixels have been grouped and loaded into the registers, a convolution operation may be performed on each of the first, second, third and fourth groups 706-712 of pixels using a smaller filter (smaller than the original filter of size 5×5) with a stride of 1 and dilation of 1. Grouping the pixels in this manner eliminates the use of shared memory instructions (for convolutions), which results in higher speed operations and more efficient power management. If shared memory instructions are used, as in conventional techniques, pixel data are first moved into shared memory, then each thread in a warp grabs a corresponding pixel and loads the pixel into a register in the GPR of its own portion. Convolution can then be conducted in the ALU with all threads in a warp active. Although warp utilization may be 100% in this case, extra shared memory reading and writing, as well as pixel offset calculations (to locate the right pixel per thread), slows down the overall computational speed, and increases the total power consumption.

For example, the first group 706 of pixels (with a granularity of a half warp with 8 bytes per pixel) may be treated as a convolution pixel group having a 3×3 filter of stride 1, the second group 708 of pixels may be treated as a convolution pixel group having a 3×2 filter of stride 1, the third group 710 of pixels may be treated as a convolution pixel group having a 2×3 filter of stride 1, and the fourth group 712 of pixels may be treated as a convolution pixel group having a 2×2 filter of stride 1. Accordingly, in this example, with an original filter size of stride 2 (up to 7×7), each group has a unique filter size with a stride of 1.

The results of each convolution operation represents a single group of a 4×8 pixel region for each of the first, second, third and fourth groups 706-712. In one embodiment, where a stride of 2 is selected for the filter to convolve around pixel data (i.e., input), the results (one for each of the four groups) are added together (per thread) to generate the final results of a 4×8 pixel region for the original convolution with a filter (in this example, a 5×5 filter) of stride of 2. For example, if the results are saved in R10, R11, R12, R13, respectively, for the four groups of smaller convolutions, for each thread of the warp, R10+R11+R12+R13 is the final result for this thread, which corresponds to an output pixel.

In one other embodiment, where a dilation of 2 is selected for the filter, the results (one for each of the four groups) are reassembled into an 8×16 pixel region that represents the final results for the original convolution with an H×W filter of dilation 2. Reassembly may comprise, for example, a reverse of the separation of the quad 703 of pixels into four groups. For example, for each of the results of the four groups, at pixel (i,j), where 0≤i<4, 0≤j<8 (which corresponds to the result of thread (i*8+j)), are reassembled into the 8×16 region at
- (i*2, j*2) for the per thread calculation from the first group 706 (pixels of type "o") convolution,
- (i*2, j*2+1) for the per thread calculation from the second group 708 (pixels of type "x") convolution,
- (i*2+1, j*2) for the per thread calculation from third group 710 (pixels of type "+") convolution, and
- (i*2+1, j*2+1) for the per thread calculation from the fourth group 712 (pixels of type "−") convolution.

In one embodiment, shared memory may be used during the reassembly. For example, thread 0 of the warp for the second group 708 writes the result into a shared memory (e.g., p01). That is, the shared memory instructions can write results in groups 706, 708, 710 and 712 into the right pixel locations in shared memory, as defined in the reassembly. Then the pixels per warp may be loaded into the GPR 340 and written to external memory.

Figure 8A:
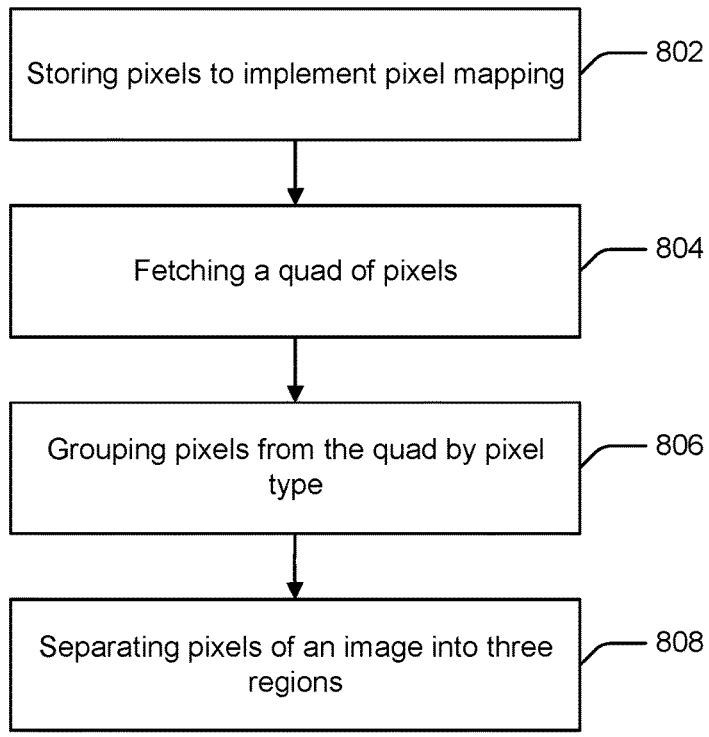
FIGS. 8A and 8B illustrate flow diagrams of mapping pixels into registers of a general purpose register.
Figure 8B:
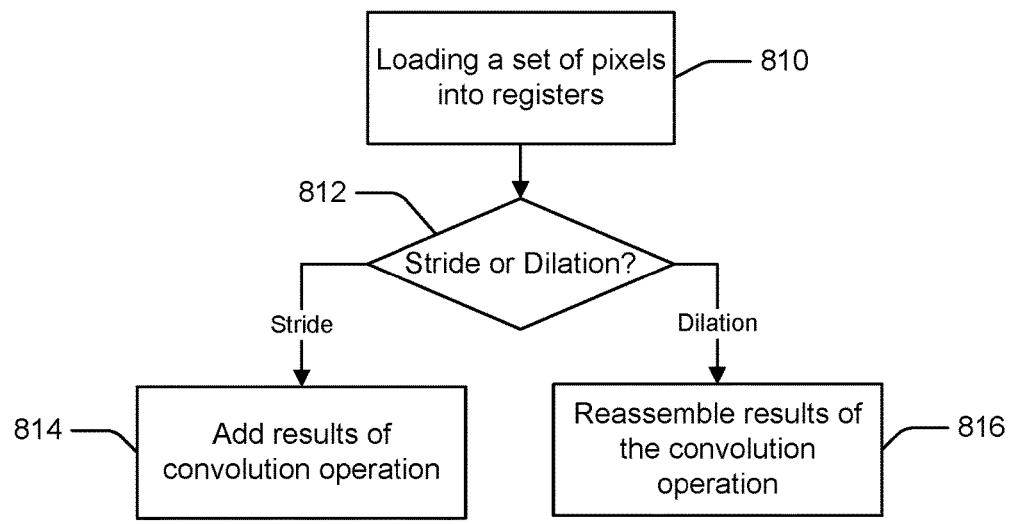

FIGS. 8A and 8B illustrate flow diagrams of mapping pixels into registers of a general purpose register. For purposes of discussion, the processes described in the following flow diagram are implemented by core 170 of the GPU 140. However, it is appreciated that any other functional unit or processing unit may implement the processes described herein, and the disclosure is not limited to implementation by the core 170.

With reference to FIG. 8A, the core 170 stores pixels of an image in order to implement a pixel mapping at step 802. In one embodiment, the pixels are stored in L1 cache 350. At step 804, a 2×2 region of pixels (i.e., a quad of pixels) are read from the L1 cache 350 by ALU 310 independently of shared memory 360, and at step 806 the pixels in each region of the quad 703 are grouped into respective first, second, third and fourth groups based on a pixel type in each region of the quad 703. At 808, the pixels are separated into three regions, as shown for example in FIGS. 5C and 7. For the first group, a body 502 includes a first set of pixels (e.g., p00.c0~c3, p02.c0~c3, . . . p0e.c0~c8, p20.c0~c3,p22.c0~c3 . . . p2e.c0~c3,p40.c0~c3 . . . p4e.c0~c3,p60.c0~c3 . . . p6e.c0~c3, where e=14), a bottom padding 504 includes a second set of pixels (e.g., p70.c0~c3, p72.c0~c3 . . . p7e.c0~c3, p90.c0~c3, p92.c0~c3 . . . p9e.c0~c3) and a right padding 506 includes a third set of pixels (e.g., p0g.c0~c3, p2g.c0~c3, . . . pag.c0~c3, p0i.c0~c3, . . . pai.c0~c3, where g=16, i=18). The second, third and fourth groups are loaded into registers in a similar manner.

Turning to FIG. 8B, at step 810, and for each group of pixels, the first set of pixels in a group are loaded into one or more first registers (e.g., registers R12-R13 of FIG. 5C) in the body 502 in a horizontal manner, the second set of pixels in a group are loaded into one or more second registers (e.g. register R14) in the bottom padding 504 in a horizontal manner, and the third set of pixels in a group into one or more third registers in the right padding 506 in a vertical manner. In one embodiment, each of the registers in the first, second and third set of registers are loaded as a contiguous ordered number of registers in the GPR 340.

Upon loading the set of pixels for each group into the registers, the results of the convolution operation for each group is determined by adding or reassembling the results. If the filter used during the convolution operation has a stride of 2, as determined at step 812, the results of the convolution for each group are added together to obtain the results of the convolution for the original pixel data 702 at step 814. If the filter used during the convolution operation has a dilation of 2, as determined at step 812, the results of the convolution for each group are reassembled in a reverse order of the separating quad 703 at 816, as described above with reference to FIG. 7.

Figure 9:
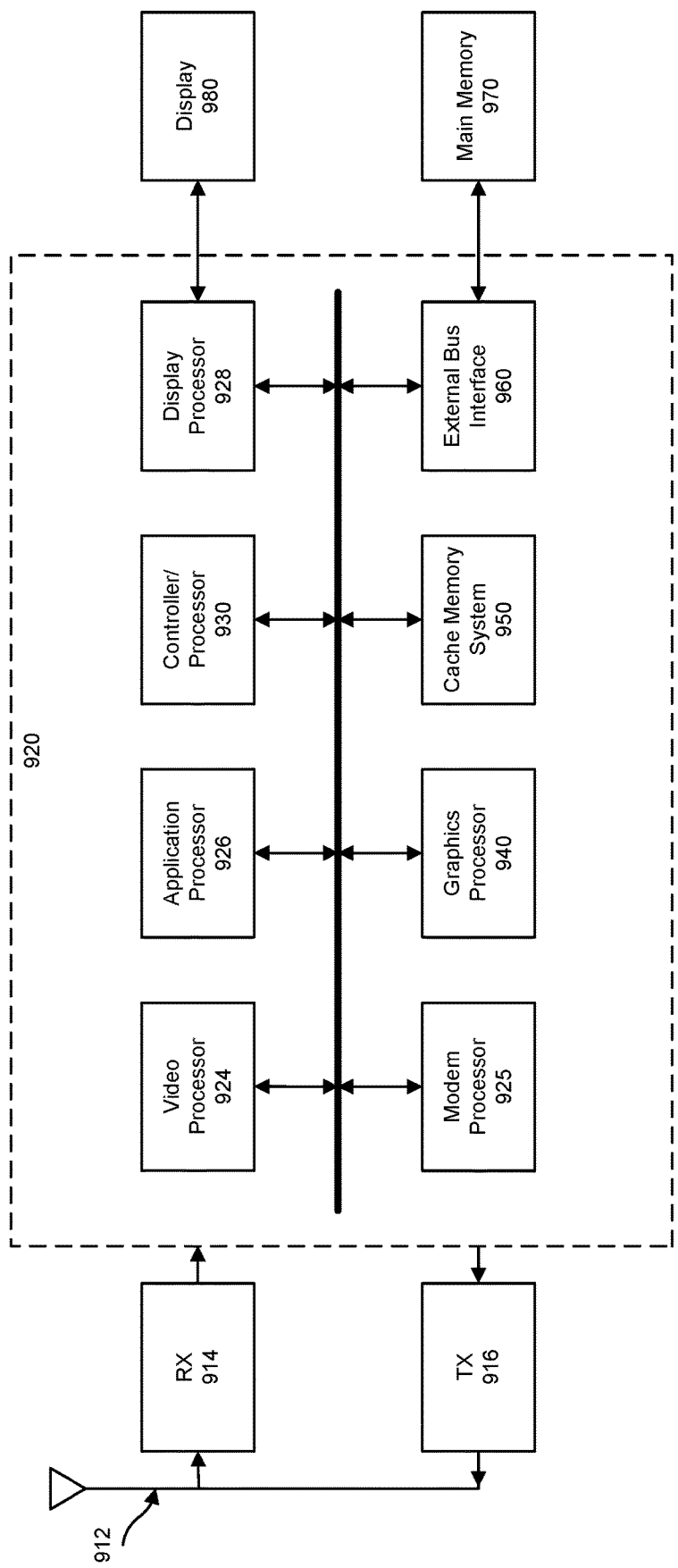
FIG. 9 shows a block diagram of an embodiment of a wireless device 900 in a wireless communication system.

FIG. 9 shows a block diagram of an embodiment of a wireless device 900 in a wireless communication system. Wireless device 900 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 900 is capable of providing bi-directional communication via a receive path and a transmit path. On the receive path, signals transmitted by base stations are received by an antenna 912 and provided to a receiver (RX) 914. Receiver 914 conditions and digitizes the received signal and provides samples to a digital section 920 for further processing. On the transmit path, a transmitter (TX) 916 receives data to be transmitted from digital section 920, processes and conditions the data, and generates a modulated signal, which is transmitted via antenna 912 to the base stations.

Digital section 920 includes various processing and interface units such as, for example, a modem processor 925, a video processor 924, an application processor 926, a display processor 928, a controller/processor 930, a graphics processor 940, cache memory system 950 and an external bus interface 960. Modem processor 925 performs processing for data transmission and reception (e.g., encoding, modulation, demodulation, and decoding). Video processor 924 performs processing on video content (e.g., still images, moving videos, and moving texts) for video applications such as camcorder, video playback, and video conferencing. Application processor 926 performs processing for various applications such as multi-way calls, web browsing, media player, and user interface. Display processor 928 performs processing to facilitate the display of videos, graphics, and texts on a display 980. Controller/processor 930 may direct the operation of various processing and interface units within digital section 920.

Graphics processor 940 performs processing for graphics applications and may be implemented as described above. For example, graphics processor 940 may include multiprocessors 160, shared memory 168, core 172, instruction unit 165, etc. (FIG. 1). Graphics processor 940 may also perform processes 802-816 in FIGS. 8A and 8B and/or other processes. Application processor 926 may execute one or more compilers that may perform processes 802-816 and/or other processes. A cache memory system 950 stores data and/or instructions for graphics processor 940. Cache memory system 950 may be implemented with configurable caches that may be assigned to different engines within graphics processor 940 and/or dedicated caches that are assigned to specific engines. External bus interface 960 facilitates transfer of data between digital section 920 (e.g., the caches) and main memory 970.

Digital section 920 may be implemented with one or more digital signal processors (DSPs), micro-processors, reduced instruction set computers (RISCs), etc. Digital section 920 may also be fabricated on one or more application specific integrated circuits (ASICs) or some other type of integrated circuits (ICs).

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A graphics processing unit (GPU), comprising:
a general purpose register (GPR) comprising registers;
an arithmetic logic unit (ALU) configured to read pixels of an image independently of a shared memory;
a level 1 (L1) cache coupled to the GPR and configured to store the pixels read by the ALU; and
wherein the ALU is configured to implement a pixel mapping that maps the pixels read from the L1 cache to the registers of the GPR, wherein implementing the pixel mapping comprises:
fetching a quad of pixels from the L1 cache, wherein the quad includes pixels of first, second, third, and fourth pixel types based on a position in the quad;
grouping the pixels of the first, second, third, and fourth pixel types respectively into four groups, wherein the four groups comprising a first group that includes a first set of pixels of a first pixel type, a second group that includes a second set of pixels of a second pixel type, a third group that includes a third set of pixels of a third pixel type, and a fourth group that includes a fourth set of pixels of a fourth pixel type; and
for each of the four groups, separating the pixels included in the group into three regions, the three regions for each group comprising a first region having a fifth set of pixels, a second region having a sixth set of pixels, and a third region having a seventh set of pixels.

2. The GPU of claim 1, wherein the ALU is further configured to implement the pixel mapping for each of the four groups by:
loading the fifth set of pixels into one or more first registers corresponding to the first region in a horizontal manner, the sixth set of pixels into one or more second registers corresponding to the second region in a horizontal manner, and the seventh set of pixels into one or more third registers corresponding to the third region in a vertical manner, wherein
in each of the four groups, each of the registers in the one or more first, second and third registers are separately loaded as a contiguous ordered number of registers in the GPR.

3. The GPU of claim 2, wherein the one or more third registers for each of the four groups in the GPR are loaded as the contiguous ordered number of registers in reverse order.

4. The GPU of claim 2, wherein in each of the four groups:
the first region has a fixed amount of pixels loaded in the one or more first registers,
the second region has a variable amount of pixels loaded in the one or more second registers based on a convolution filter size, and
the third region has a variable amount of pixels loaded in the one or more third registers based on a convolution filter size.

5. The GPU of claim 2, wherein a granularity of the pixels is a half warp with eight bytes per pixel mapped into the one or more first, second and third registers of the GPR in each of the four groups.

6. The GPU of claim 1, wherein the ALU is configured to:
perform a convolution operation for each of the four groups based on a respective pixel mapping; and
add results of the convolution operation for each of the four groups.

7. The GPU of claim 6, wherein the convolution operation implements a convolution filter of a same size for the first, second, third, and fourth groups.

8. The GPU of claim 1, wherein the ALU is configured to:
perform a convolution operation for each of the four groups based on a respective pixel mapping; and
reassemble the results of the convolution operation for each of the groups.

9. The GPU of claim 1, wherein, in each of the four groups, the first region is a body, the second region is a bottom padding, and the third region is a right padding.

10. The GPU of claim 1, wherein the pixels stored in the GPR are convolution filter independent.

11. The GPU of claim 1, wherein, in each of the four groups, the pixel mapping is independent of a convolution filter size and fixed relative to a location of an anchor register in the one or more first registers corresponding to the first region.

12. A computer-implemented method in a graphics processing unit (GPU) mapping pixels into registers of a general purpose register (GPR), the method comprising:
   storing the pixels in a level 1 (L1) cache;
   reading the pixels, by an arithmetic logic unit (ALU), independently of a shared memory; and
   mapping pixels read by the ALU from the L1 cache into the registers of the GPR, comprising:
      fetching a quad of pixels from the L1 cache, wherein the quad includes pixels of first, second, third and fourth pixel types based on a position in the quad;
      grouping the pixels of the first, second, third and fourth pixel types respectively into four groups, wherein the four groups comprising a first group that includes a first set of pixels of a first pixel type, a second group that includes a second set of pixels of a second pixel type, a third group that includes a third set of pixels of a third pixel type, and a fourth group that includes a fourth set of pixels of a fourth pixel type; and
      for each of the four groups, separating the pixels included in the group into three regions, the three regions for each group comprising a first region having a fifth set of pixels, a second region having a sixth set of pixels, and a third region having a seventh set of pixels.

13. The computer-implemented method of claim 12, wherein the pixel mapping for each of the four groups further comprises:
   loading the fifth set of pixels into one or more first registers corresponding to the first region in a horizontal manner, the sixth set of pixels into one or more second registers corresponding to the second region in a horizontal manner, and the seventh set of pixels into one or more third registers corresponding to the third region in a vertical manner, wherein
   in each of the four groups, each of the registers in the one or more first, second and third registers are separately loaded as a contiguous ordered number of registers in the GPR.

14. The computer-implemented method of claim 13, wherein in each of the four groups:
   the first region has a fixed amount of pixels loaded in the one or more first registers,
   the second region has a variable amount of pixels loaded in the one or more second registers based on a convolution filter size, and
   the third region has a variable amount of pixels loaded in the one or more third registers based on a convolution filter size, wherein:
      in each of the four groups, the first region is a body, the second region is a bottom padding, and the third region is a right padding.

15. The computer-implemented method of claim 13, wherein a granularity of the pixels is a half warp with eight bytes per pixel mapped into the one or more first, second and third registers of the GPR in each of the four groups.

16. The computer-implemented method of claim 12, wherein:
   performing, by the ALU, a convolution operation for each of the four groups based on a respective pixel mapping; and
   adding, by the ALU, results of the convolution operation for each of the four groups.

17. The computer-implemented method of claim 16, wherein the convolution operation implements a convolution filter of a same size for the first, second, third, and fourth groups.

18. The computer-implemented method of claim 12, wherein:
   performing, by the ALU, a convolution operation for each of the four groups based on a respective pixel mapping; and
   reassembling, by the ALU, the results of the convolution operation for each of the groups.

19. The computer-implemented method of claim 12, wherein the one or more third registers for each of the first, second, third and fourth groups in the GPR are loaded as the contiguous ordered number of registers in reverse order.

20. The computer-implemented method of claim 12, wherein the pixels stored in the GPR are convolution filter independent and wherein, in each of the four groups, the pixel mapping is independent of a convolution filter size and fixed relative to a location of an anchor register in the one or more first registers corresponding to of the first region.

* * * * *

UNITED STATES PATENT AND TRADEMARK OFFICE
CERTIFICATE OF CORRECTION

PATENT NO. : 11,915,338 B2
APPLICATION NO. : 17/319301
DATED : February 27, 2024
INVENTOR(S) : Zhou Hong and Yufei Zhang Page 1 of 1

It is certified that error appears in the above-identified patent and that said Letters Patent is hereby corrected as shown below:

In the Claims

Column 24, Line 46, Claim 20, after "to" please delete "of".

Signed and Sealed this
Twenty-first Day of May, 2024

Katherine Kelly Vidal
*Director of the United States Patent and Trademark Office*